United States Patent [19]

Suzuki et al.

[11] Patent Number: 5,432,584
[45] Date of Patent: Jul. 11, 1995

[54] LENS ACCOMMODATION DEVICE FOR A CAMERA

[75] Inventors: Noboru Suzuki; Shigeo Toji, both of Tokyo; Masahiro Kawasaki, Saitama, all of Japan

[73] Assignee: Asahi Kogaku Kogyo Kabushiki Kaisha, Tokyo, Japan

[21] Appl. No.: 956,581

[22] Filed: Oct. 5, 1992

Related U.S. Application Data

[63] Continuation of Ser. No. 414,476, Sep. 29, 1989, abandoned.

[30] Foreign Application Priority Data

Sep. 29, 1989 [JP] Japan .............................. 63-127986 U

[51] Int. Cl.⁶ .............................................. G03B 13/36
[52] U.S. Cl. ..................................... 354/400; 354/187; 354/286
[58] Field of Search .................... 354/195.1, 286, 400, 354/187

[56] References Cited

U.S. PATENT DOCUMENTS

| | | | |
|---|---|---|---|
| 4,145,732 | 3/1979 | Pandres, Jr. ........................ | 364/109 |
| 4,156,933 | 5/1979 | Pandres, Jr. ........................ | 364/109 |
| 4,857,951 | 8/1989 | Nakajima et al. ............... | 354/195.1 X |
| 4,860,113 | 8/1989 | Miyamoto et al. ............... | 354/286 X |
| 4,944,030 | 7/1990 | Haraguchi et al. ............... | 354/403 |
| 4,945,376 | 7/1990 | Kawasaki et al. ............... | 354/400 |
| 4,951,075 | 8/1990 | Tokumaru et al. ............... | 354/400 |
| 5,063,402 | 11/1991 | Shimada et al. ............... | 354/400 |
| 5,065,175 | 11/1991 | Suzuki et al. ............... | 354/400 |
| 5,066,968 | 11/1991 | Suzuki et al. ............... | 354/400 |
| 5,093,680 | 3/1992 | Suzuki et al. ............... | 354/400 |
| 5,157,434 | 10/1992 | Suzuki et al. ............... | 354/402 |

FOREIGN PATENT DOCUMENTS

| | | |
|---|---|---|
| 0262679 | 4/1988 | European Pat. Off. . |
| 53-113527 | 10/1978 | Japan . |
| 54-25819 | 2/1979 | Japan . |
| 58-103273 | 6/1983 | Japan . |
| 59-48742 | 3/1984 | Japan . |
| 62-133430 | 6/1987 | Japan . |
| 62-133431 | 6/1987 | Japan . |
| 62-200340 | 9/1987 | Japan . |
| 63-5331 | 1/1988 | Japan . |
| 63-189817 | 8/1988 | Japan . |
| 63-220118 | 9/1988 | Japan . |
| 64-44428 | 2/1989 | Japan . |
| 64-44429 | 2/1989 | Japan . |
| 64-56406 | 3/1989 | Japan . |
| 64-62608 | 3/1989 | Japan . |
| 64-79713 | 3/1989 | Japan . |
| 199011 | 4/1989 | Japan . |
| 199012 | 4/1989 | Japan . |
| 1123206 | 5/1989 | Japan . |
| 1131509 | 5/1989 | Japan . |
| 1232311 | 9/1989 | Japan . |
| 2-12116 | 1/1990 | Japan . |

OTHER PUBLICATIONS

English Abstract of Japanese Patent No. 58-103273.

Primary Examiner—Khanh Dang
Attorney, Agent, or Firm—Sandler, Greenblum & Bernstein

[57] ABSTRACT

A lens accommodation device for a camera employing a lens unit that is interchangeably mounted to a camera body. The lens unit provides data to the camera body as to whether the photographic lens thereof is accommodatable. If the lens is accommodatable, the photographic lens of the lens unit is driven in a direction in which the photographic lens is accommodated when a predetermined condition occurs.

49 Claims, 6 Drawing Sheets

LENS ACCOMMODATION DEVICE FOR A CAMERA

This application is a continuation of application Ser. No. 07/414,476, filed 09/29/89, now abandoned.

BACKGROUND OF THE INVENTION

The present invention relates to a lens accommodation device for a camera that is capable of exchanging photographic lenses.

Some so-called compact cameras, which are to exchange a photographic lens, employ a system wherein a lens group is automatically accommodated when the camera is not used, so as reduce the projecting length of the lens group and to facilitate the portability of the camera.

Such a lens accommodation system is not employed in cameras having interchangeable lenses for several reasons. First, whereas a lens shutter zoom camera employs a single lens, an SLR camera uses a plurality of lenses, some of which may be zoom lenses and some of which may be of a fixed focal length. Furthermore, some type of zoom lenses, such as a vari-focal type zoom lens, have an over-all length that does not change as the focal length of the lens is changed. In addition, even if the over-all length of the lens changes as the focal length of the lens is changed, the amount of the lens length change varies from lens type to lens type. Thus, in order to prevent possible damage to a lens accommodation system, the SLR camera would need to know whether the lens attached to the camera body can be accommodated, and if it can be accommodated, when to terminate the lens retracting operation. Therefore, the techniques used to accommodate a lens on a lens shutter camera are inapplicable to cameras employing interchangeable lenses.

SUMMARY OF THE INVENTION

It is therefore an object of the present invention to provide a lens accommodation device that is suitably applicable to a camera that is capable of exchanging photographic lenses, and which, capable of automatically accommodating a lens group to make the size thereof smaller to facilitate the portability of the camera when it is not used.

For the above purpose, according to this invention, there is provided a lens accommodation device for a camera comprising a camera body and a lens unit that is interchangeably mounted to the camera body, wherein the lens unit is provided with means for providing data to the camera body, the data representing whether a photographic lens thereof is accommodatable; and wherein the lens accomodation device comprises means for driving the photographic lens of the lens unit in a direction in which the photographic lens is accommodated under a predetermined condition when the photographic lens of the lens unit mounted to the camera body is an accomodatable lens.

DESCRIPTION OF THE ACCOMANYING DRAWINGS

DESCRIPTION OF THE EMBODIMENT

Figure 1:
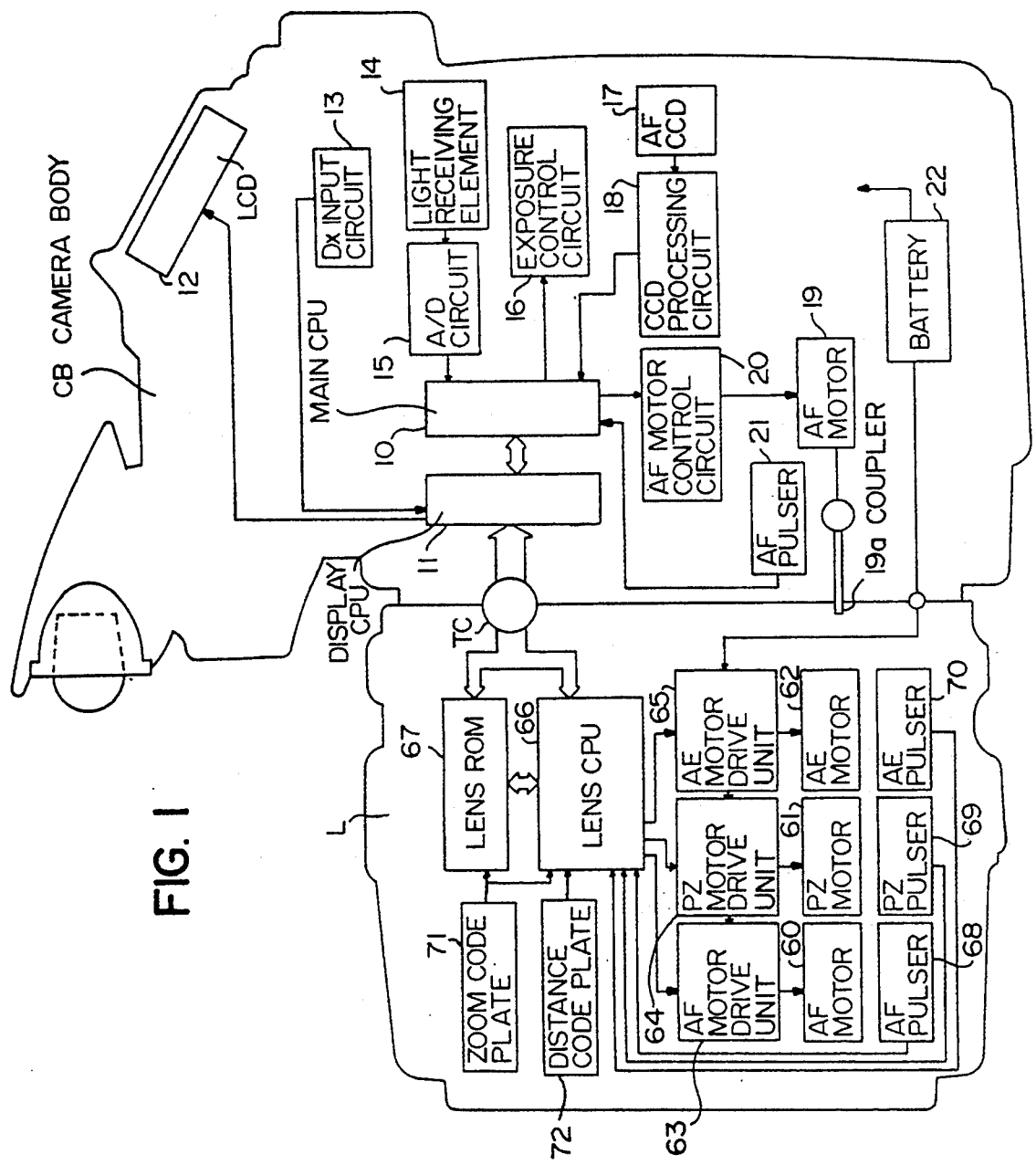
FIG. 1 is a block diagram illustrative of an overall system.

Although the embodiment will be described with reference to an automatic single lens reflex camera shown in the drawings, it is also applicable to a still video camera and the like. A camera body CB is interchangeably provided with various photographing lenses mounted thereon by a known arrangement as shown in the drawings.

FIG. 1 is a block diagram of a combined system of a photographic lens L and a camera body CB embodying the invention.

The camera body CB is provided with two CPUs, a main CPU 10 used to process various kinds of data for photographing, and a display CPU 11 used to input data, supply and receive data to and from a photographic lens L, and display information. The camera body CB is provided with an LCD panel 12 for displaying various kinds of information, a DX code input circuit 13 for inputting an ISO (International Standard Organization) sensitivity of a film from a DX code printed on a film cartridge, a light receiving element 14 for measuring the luminance of an object to be photographed from light that passes through the photographic lens L, and A/D (Analog/Digital) converter 15 for effecting an analog to digital conversion of an output from the light receiving element, an exposure control circuit 16 for controlling a shutter based on various input photographing conditions, a CCD 17 for automatic focusing (AF) for receiving light from the image of the object to be photographed which is formed by the light incident through the photographing lens L, and a CCD processing circuit 18 for detecting a focusing state of the photographing lens L based on an output from the CCD 17 for AF (Automatic Focusing), together with the CPUs as the central units.

Further, when a conventional type photographic lens L, not having an AF motor therein is mounted, an AF motor 19 for focusing the photographic lens is used to transmit a driving force to the photographic lens L side through a coupler 19a attached to a mounting port, in association with an AF motor control circuit 20, for driving the AF motor 19 by calculating an output from the CCD processing curcuit 18 and an AF pulser 21 for detecting a driving amount of the AF motor 19 as a number of pulses, and, thus, the AF motor 19 is not used in the case shown in FIG. 1.

Battery 22 supplies power to respective active elements in the above camera body CB, as well as to the motors in the photographic lens L to be described later, and the CPUs.

The the photographic lens L contains three motors, an AF motor 60, a power zoom (PZ) motor 61, and an automatic aperture control (AE) motor 62, so that automatic focusing, power zooming and aperture control can be carried out by driving-forces in the lens unit. The power zoom (PZ) motor 61 provides power for zooming of the photographic lens L and can thus be considered as a power assist or power assisted means, as can each of the other motors provided in the lens and/or camera, in view of their described functions.

The photographic lens L has cam mechanisms like conventional ones which effect focusing and zooming by moving each lens group in an optical axis direction by the rotation of cam rings. The AF motor 60 and the PZ motor 61 are used to rotate the cam rings.

The respective motors are controlled by a lens CPU 66, that is used as a calculation means, through an AF motor drive unit 63, a PZ motor drive unit 64 and an AE motor drive unit 65.

A data input means for the lens CPU 66 includes a lens ROM 67 for storing data inherent to the photographic lens, an AF pulser 68 for detecting a drive amount of each motor by converting the drive amount to a number of pulses, a PZ pulser 69, an AE pulser 70, a zoom code plate 71 and a distance code plate 72 for detecting rotational positions of the zooming cam ring and the focusing cam ring, respectively.

Note that in practical use the code plate comprises a combination of a code plate fixed to the cam ring and a plurality of brushes which are attached to a fixed ring and which are in sliding contact with the code plate so that an absolute rotational position of the ring is detected by the contact state of the brushes. However, the term "code plate" is used here to conveniently refer to all of the above members as a whole.

The lens CPU 66 can communicate with the camera body CB through electric contacts TC, to be described below, in addition to being coupled with the above control subjects and the input means. For example, the CPU 66 has a function for driving the AF motor 60 by calculating a driving amount thereof, based upon a defocus amount detected on the camera body CB side while referring to data of the lens ROM 67, and then detecting a driven amount of the motor by the AF pulser 68, a function for driving the AE motor 62 being based on an aperture value determined on the camera body CB side, while also detecting a driven amount thereof by the AE pulser 70 and the like.

A lens mount of the camera body CB is provided with an electric contact group T1 composed of ten electrical contacts insulated from the surface of the camera body mounting ring.

On the other hand, the mounting portion of the photographic lens L is provided with an electric contact group T2 corresponding to the electric contact group T1 provided on the camera body CB.

When the photographic lens L is mounted on the camera body CB, each contact of the electrical contact group T1 is brought into contact with a corresponding contact of the electric contact group T2, having the same identifying names as that of the group T1, in order to form the above electrical contact group TC.

This system will be described below with reference to the detailed circuit diagrams.

Figure 2:
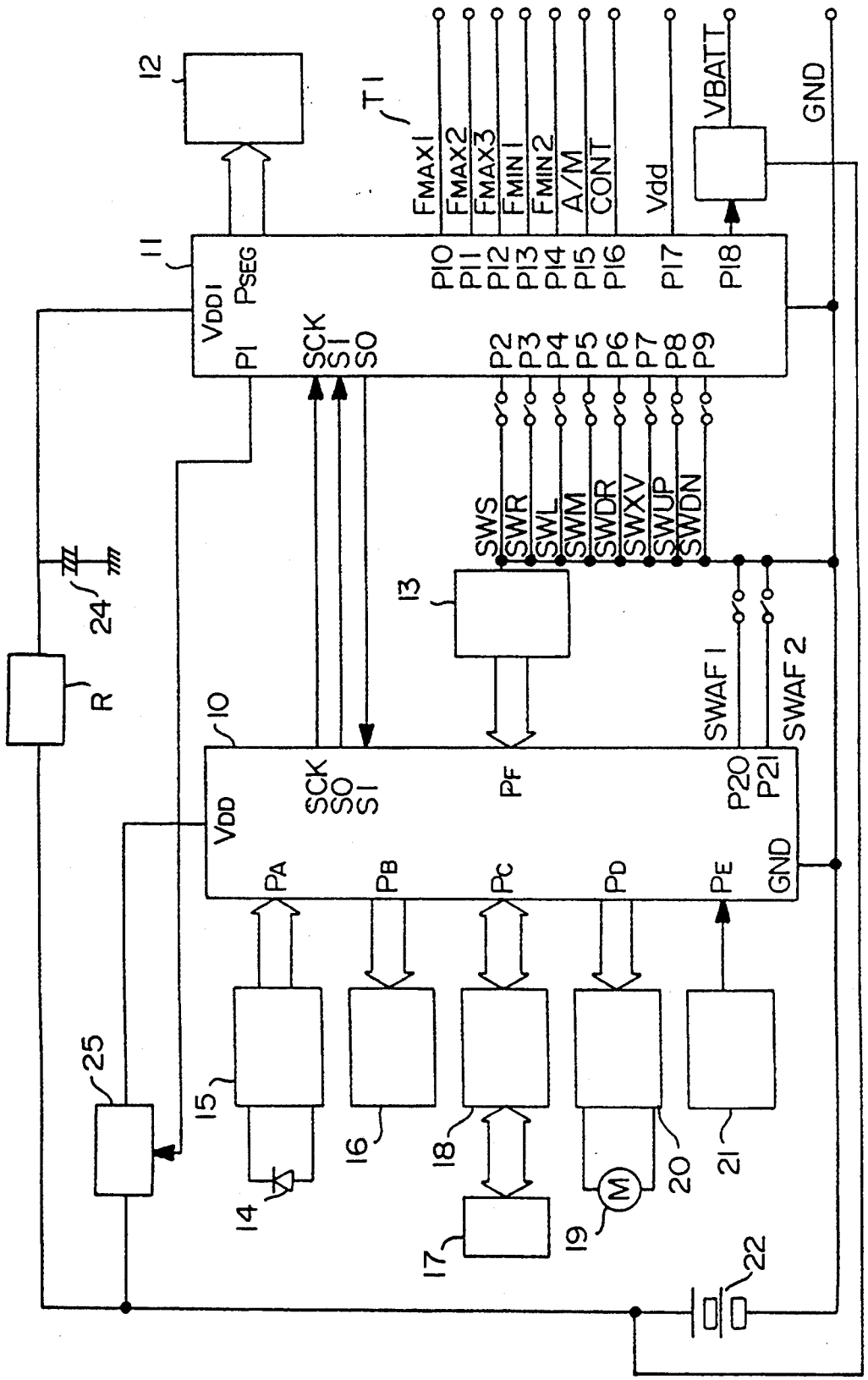
FIG. 2 is a diagram of a circuit in a camera body.

FIG. 2 illustrates a circuit in the camera body CB.

The display CPU 11 has a terminal $V_{DD1}$ supplied with a voltage from the battery 22 after it is subjected to a voltage transformation by a regulator R, which is backed up by a super capacitor 24, and is operated at a constant voltage at all times. In addition, the display CPU 11 has a terminal P1 coupled to a DC/DC converter 25 for turning ON/OFF a power supply to the main CPU 10, and a terminal P2 coupled with a light measuring switch $SW_S$ which is turned ON by depressing a shutter button halfway, a terminal P3 coupled with a release switch $SW_R$ which is turned ON by fully depressing the shutter button, and a terminal P4 coupled with a lock switch $SW_L$, which is turned ON when the camera is enabled to take a photograph, and when data from the respective switches are input.

The lock switch $SW_L$ serves as a main switch in this invention, and is mounted on the camera body CB.

The DC/DC converter 25 supplies power to the terminal $V_{DD}$ of the CPU 10 when the light measuring switch $SW_S$ is turned ON in a state that the lock switch $SW_L$ is turned ON.

Further, terminal P5 is coupled with a mode switch $SW_M$ which is turned ON to select photographing modes such as a programmed photographing mode, an automatic photogtaphing mode, a manual photographing mode and the like, terminal P6 is coupled with a drive switch $SW_{DR}$ which is turned ON to select a single-shot photographing mode, a sequential-shot photographing mode, or the like, and terminal P7 is coupled with an exposure correction switch $SW_{XV}$ which is turned ON to enable a set exposure to be corrected. Respective set states can be changed by by operating an up-count switch $SW_{UP}$, coupled to terminal P8 or a down-count switch $SW_{DN}$ coupled to terminal P9 in a state such that the switches coupled with terminals P5 to P7 are turned ON, respectively.

Terminal group $P_{SEG}$ is used to operate the LCD panel 12, which displays stored information when the lock switch $SW_L$ is turned ON.

The main CPU 10 has a contact group PA coupled with the A/D converter 15 for measuring light, a contact group PB coupled with the exposure circuit 16, a contact group coupled with the CCD processing circuit 18, a contact group PD coupled with the AF motor control circuit 20, a contact group PE coupled with the AF pulser 21, and a contact group PF coupled with the DX input circuit 13.

Note that the A/D converter 15 is coupled with the light receiving element 14 for measuring light, the CCD processing circuit 18 is coupled with the CCD 17 for AF (Automatic Focusing), and the AF motor control circuit 20 is coupled with the AF motor 19 in the camera body CB, as described above.

Further, the main CPU 10 has a terminal P20 coupled with a first automatic focusing switch $SW_{AF}1$ for changing the focusing between an automatic mode effected by driving the AF motor and a manual mode effected by manual driving by a user, and a terminal P21 coupled with a second automatic focusing switch $SW_{AF}2$ for changing a shutter release mode between a focus-priority mode and shutter-priority mode.

Figure 3:
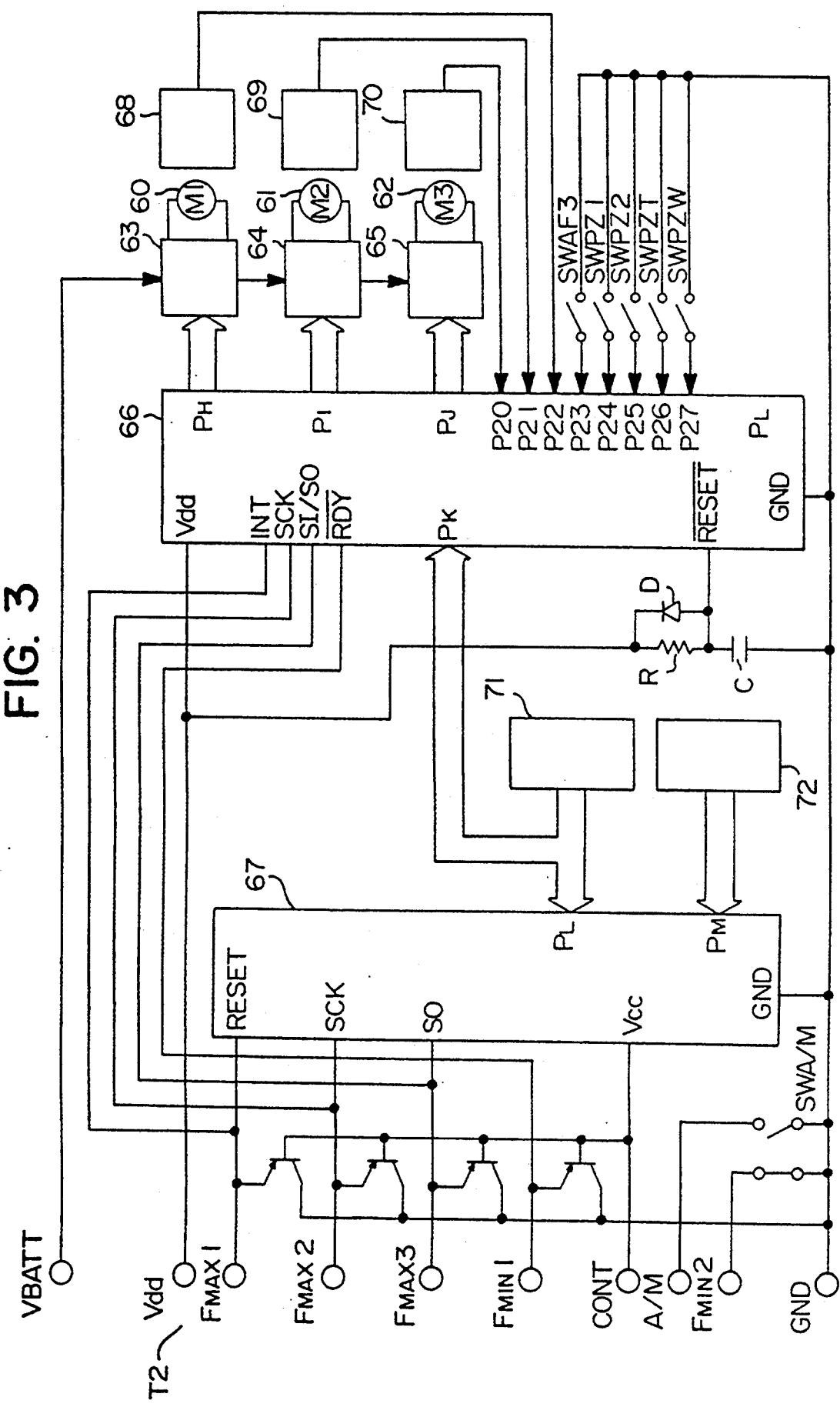
FIG. 3 is a diagram of a circuit in a photographic lens.

FIG. 3 illustrates a circuit in the photographic lens L.

Contact $V_{BATT}$ on the lens unit side is coupled with the respective motor drive units 63, 64 and 65 in the lens unit, and the battery 22 in the camera body CB directly supplies power to the respective motors 60, 61 and 62 when these drive units are switched on.

Note that the respective motor drive units 63, 64 and 65 are controlled by the lens CPU 66 by being coupled with the terminal groups PH, PI, and PS thereof, and that the pulsers 68, 69 and 70 are coupled with terminals P20 to P22 to input the detected driven amounts of the respective motors to the lens CPU 66.

Contact VDD is supplied from the display CPU 11 on the camera body CB side to terminal VDD of the lens CPU 66, and to a reset circuit composed of a resistor R, a diode D and a capacitor C.

A prescribed time constant is given to the reset circuit by the resistor and the capacitor so that the reset circuit function to change a $\overline{\text{RESET}}$ terminal from an active (L) state to a non-active (H) state to enable the program of the CPU 66 to start when a prescribed period of time elapses after the power is supplied to the $V_{DD}$ and the power voltage has stabilized.

The lens CPU 66 has terminals P23 to P27, respectively, coupled with a third automatic focusing switch $SW_{AF}3$ disposed on the lens unit side for changing between an automatic focusing and a manual focusing, a zoom changing switch $SW_{PZ}1$ for selecting whether zooming is to be automatically effected by the motor or to be manually effected, a constant image magnification switch $SW_{PZ}2$ for automatically effecting zooming as a camera moves with respect to an object to be photographed to maintain a given image magnification of the object, a telescopic side zoom switch $SW_{PZT}$ for driving a PZ motor 61 to move the photographic lens L in a direction to increase the focusing distance thereof, and a wide side zoom switch $SW_{PZW}$ for driving the PZ motor to move the photographic lens L in a direction to decrease the focusing distance thereof.

Lens CPU 66 is provided with a terminal INT to which an electric signal is supplied to interrupt the execution of the program of the CPU 66, a terminal SCK to which a serial clock is supplied from the display CPU 11 on the camera body CB side, a terminal SI/SD for serially transmitting data and an $\overline{RDY}$ SI/SD for synchronizing a serial communication of the CPU 66 with a peripheral unit.

After $\overline{RESET}$, a terminal voltage of the INT terminal is changed from a low value to a high value to enable interruption to the lens CPU 66, and a terminal voltage of the RDY terminal is changed to a high value to cause the display CPU 11 on the camera body CB side to wait to inhibit the execution of a serial communication, and is changed to a low value to enable the execution of the serial communication.

Further, terminal group PR of the lens CPU 66 is coupled with the code plate 71, and the distance plate 72, like the terminal groups $P_L$ and $P_M$ of the lens ROM 67, so that focusing data and distance data corresponding to an actual lens state are inputted.

Lens ROM 67 stores data inherit to the photographic lens L, such as for example, fixed data such as an open-aperture F number, a minimum aperture F number, an amount of change in an F number caused by zooming and variable data.

In particular, with this embodiment, the lens ROM 67, stores, as inherent data of the photographing lens, data regarding the accommodation of a lens, such as whether the photographic lens L is arranged to have the total length thereof expandable or contractible when each lens group is driven by the AF motor 60 or the PZ motor 61 of the photographic lens L (in this specification, this is referred to as whether accommodation is possible).

Note that the data regarding whether the photographic lens L can be accommodated is not necessarily stored in the lens ROM 67, but it can be provided with a photographic lens L by projecting a pin or the like thereon.

The data stored in the ROM 67 is transmitted to the CPU on the camera body side through the above electric contact group TC which is controlled by the lens CPU 66, or in direct response to a request from the CPU on the camera body CB side.

A camera system arranged as described above, and having the above functions, is provided with a program for accommodating the photographic lens L shown in the flowcharts illustrated in FIGS. 4 through 7.

Figure 4:
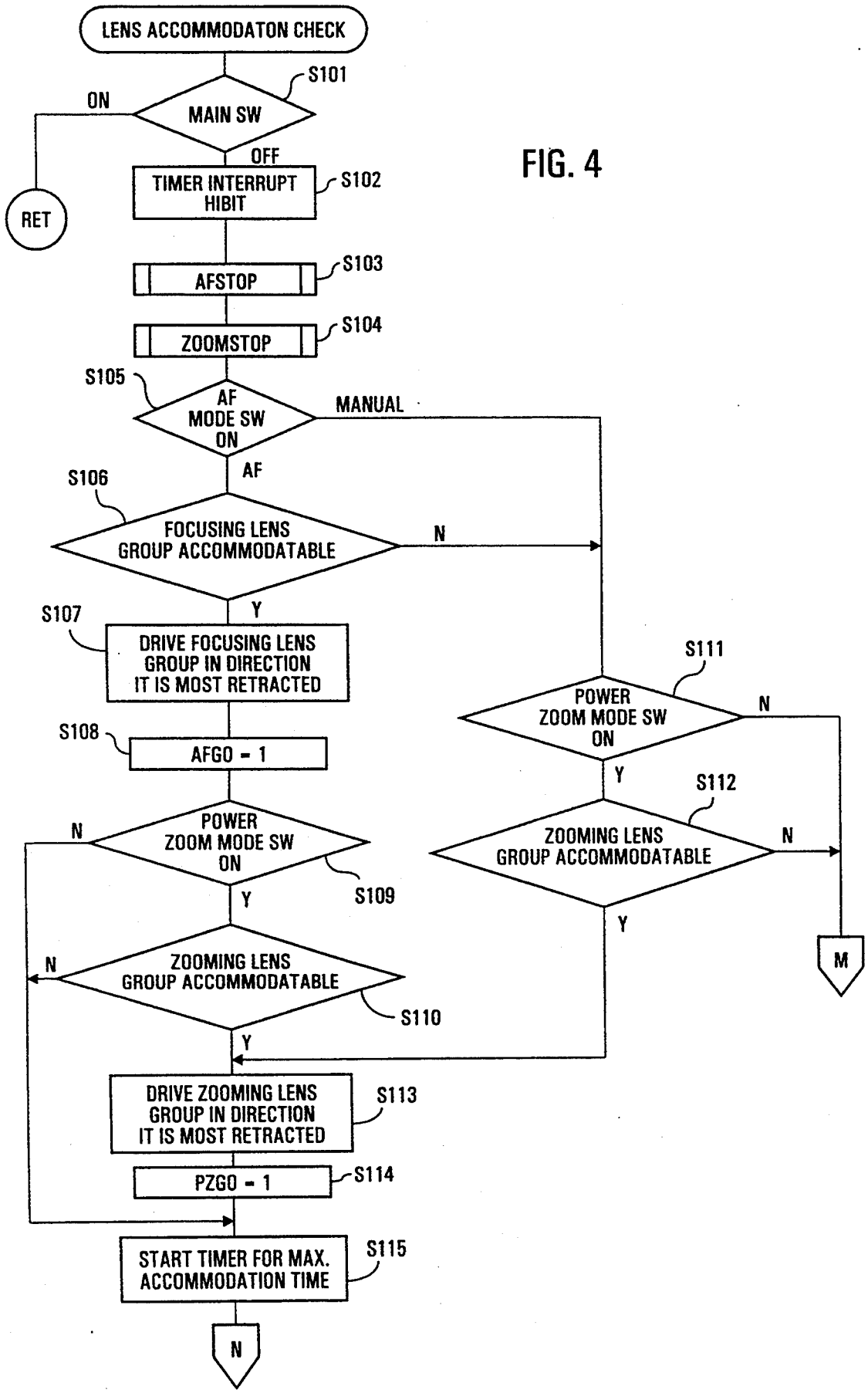
FIGS. 4 and 5 are main flowcharts regarding the accommodation of a lens in this system.
Figure 5:
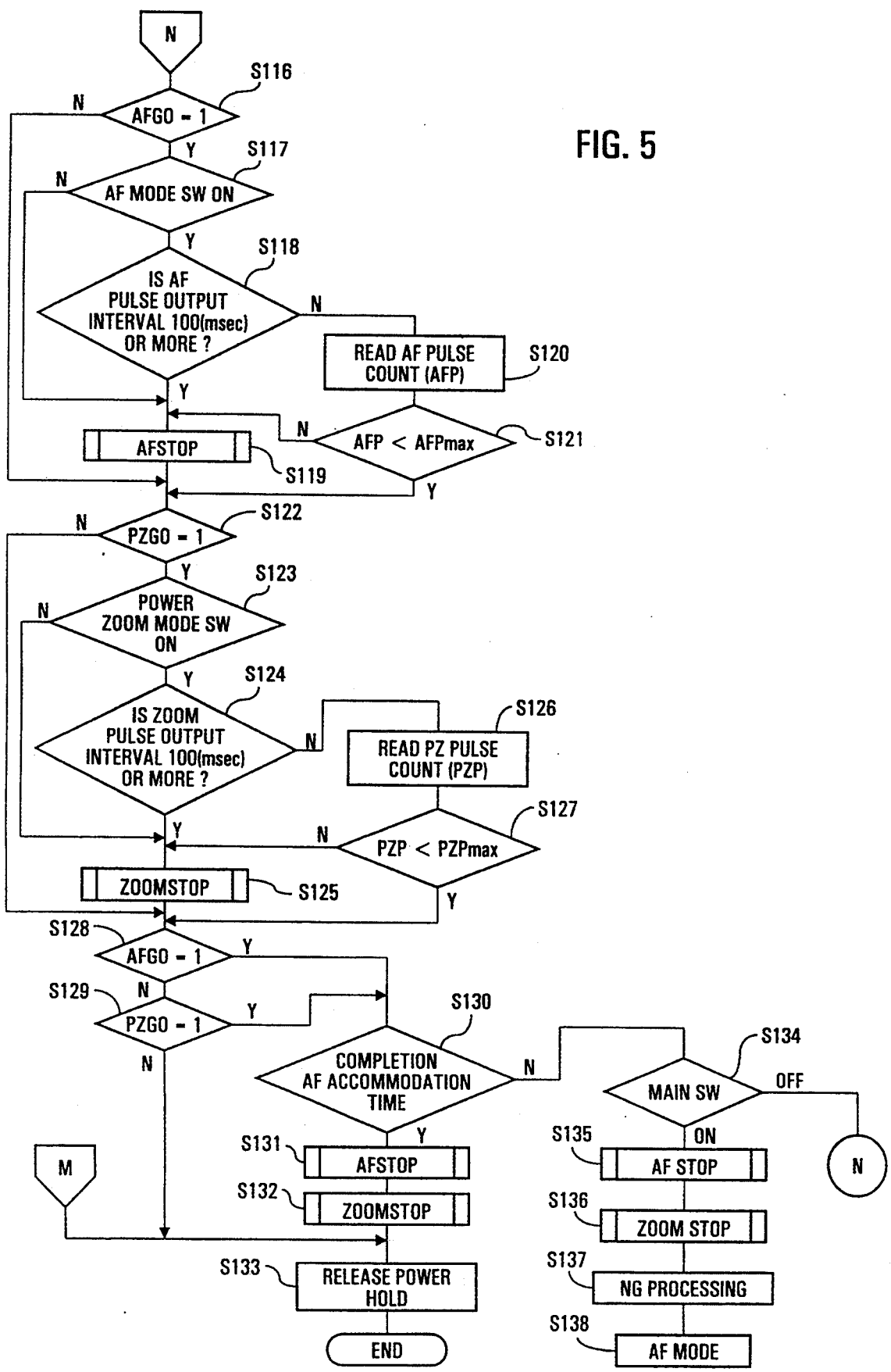

First, the main flowcharts for accommodating the photographing lens shown in FIGS. 4 and 5 will be described below, wherein a camera is in a photographing mode, such as an AF mode or the like, and when the lock switch $SW_L$ as the main switch is turned OFF, this mode is set (note that each step is referred to by a preceding S, hereinafter).

When the photographing, mode is set as described above, it is first determined at S. 101 whether the lock switch $SW_L$, as a main switch, is turned ON or OFF.

When the lock switch $SW_L$ is turned OFF, the flow goes to S. 102, and when it is turned ON, the flow returns to an original mode. This is because the intention of a user to complete photographing cannot be confirmed.

When the intention of the user to complete photographing is confirmed at S. 101, a timer interruption, such as a shutter-release processing and the like, is inhibited at S. 102.

Then, an AF (Automatic Focusing) operation and a PZ (Power Zooming) operation are stopped at S. 103. and S. 104 (these stop subroutines will be described later).

The AF operation and the PZ operation are stopped here because the photographic lens L may be driven in a direction opposite to an accommodating direction and thus, it becomes necessary to protect the motors 60 and 61.

Next, it is determined at S. 105 whether the AF mode switch (the third automatic focusing switch $SW_{AF}3$) is in an AF mode or a manual mode.

When it is in the AF mode, the flow goes to S. 106, where it is determined whether a focusing lens group of the photographic lens L mounted on the camera body CB is arranged to be accommodated based on data read from the ROM 67.

When the determination is YES, the AF motor 60 starts to drive the focusing lens group in a direction to reduce the total length of the photographing lens L at S. 107 and S. 108 and a flag mark is set to indicate that the focusing lens group is being driven for accomodation.

Then, it is determined at S. 109 whether the power zoom mode switch (the zoom changing switch $SW_{PZ}1$) is turned ON or OFF.

When the switch is turned ON, it is determined at S. 110 whether a zooming lens group of the photographic lens L mounted on the camera body CB is arranged to be accommodated based on data read from the ROM 67. When the determination is YES, the flow goes to S. 113.

On the other hand, when it is determined that the AF mode switch is turned to the manual mode at S. 105, and when it is determined that the focusing lens group of the photographic lens L mounted on the camera body CB is not arranged to be accommodated at S. 106, the same determinations as those made at S. 109 and S. 110 are made at S. 111 and S. 112, and when the power zoom mode switch is turned to a power zoom mode and the zooming lens group is arranged to be accommodated, the flow goes to the S. 113. When, however, determinations other than the above are made, the flow goes to S. 133, (see M) where a power hold is released to terminate the flow.

At S. 113 and S. 114, the PZ motor 61 starts to drive the zooming lens group in a direction in which the total length of the Photographic lens L is reduced in response to the determinations made at S. 109. S. 110, S. 111 and S. 112, a flag mark is set to indicate that the zooming lens group is driven for accomodation. The flow then goes to S. 115.

On the other hand, when it is determined at S. 109 and S. 110 that the power zoom mode switch is turned ON and the zooming lens group cannot be accommodated, the flow skips S. 113 and S. 114 and goes to S. 115.

At S. 115, a timer is started to determine a longer time (referred to as a maximum accommodation time) necessary to move from one end point and a second end point of the focusing lens and a distance between one end point and a second end point of the zooming lens which are stored in the photographic lens as the inherent values of the lens ROM 67.

Note that although a timer is started for a comparison based upon time in this step, the lens accommodation also can be controlled based upon the maximum number of pluses 1 by counting the number of pulses of the AF pulser 68 or the PZ pulser 69.

At S. 116, it is determined whether the focusing lens group is being driven for accommodation.

When the determination is YES, it is determinated at S. 177 whether the AF mode switch (i.e., the third automatic focusing switch SW$_{AF}$3) is in an AF mode or in a manual mode. When the switch is in the AF mode, it is determined at S. 118 whether pulse outputs from the AF pulser 68 have an interval of 100 msec or more.

When the interval is 100 msec or more, the flow goes to S. 119.

This is made to check to see if the focusing lens group is at an accommodation limit position, because the Pulses outputted from the AF pulser 68 having an interval of 100 msec or more mean that the focusing lens group arrives at an accommodation side end point, i.e., at the accommodation limit position.

On the other hand, when it is determined at S. 117 that the AF mode switch is turned to the manual mode, the flow SKIPS S. 118 and goes to S. 119 since no AF pulse is output.

In addition, when AFP (the number of AF pulses) read from the AF pulser 68 is greater than a maximum number of pulses AFPmax necessary to accommodate the focusing lens group, which is stored in the lens ROM 67 as an inherent value of the photographic lens L at S. 120 and S. 121, the flow goes to S. 119, even if it is determined at S. 118 that the pulse outputs from the AF pulser 68 have an interval less than 100 msec since a drive system of the focusing lens group or the like is considered to fail.

At S. 119, an AF operation stop subroutine is executed to stop the operation of the focusing lens.

On the other hand, when the determination is YES at S. 121, the flow skips the AF operation stop subroutine at S. 119 and goes to S. 122, since the operation is normally carried out.

At S. 122, it is determined whether the zooming lens group is being driven for accommodation. When the determination is YES, it is determined at S. 123 whether the power zoom mode switch (the zoom changing switch SW$_{PZ}$1) is turned ON or OFF.

When the switch is turned ON, it is determined at S. 124 whether pulse outputs from the PZ pulser 69 have an interval of 100 msec or more.

When the pulse outputs have an inteval of 100 msec or more, the flow goes to S. 125, where a zooming operation stop subroutine is executed by the PZ motor to stop the operation of the photographic lens L.

This is made for the same purpose as that at S. 118 because the pulse outputs from the PZ pulser 69, having an interval of 100 msec or more mean that the zooming lens group arrives at an accommodation side end point.

On the other hand, when it is determined at S. 123 that the power zoom mode switch is turned off, the flow skips S. 124 and goes to S. 125, since no zoom pulse is output.

In addition, when PZP read by the PZ pulser 69 is greater than the maximum number of pulses PZPmax necessary to accommodate the zooming lens group, which is stored in the lens ROM 67 as the inherent value of the photographing lens L at S. 126 and S. 127, the flow goes to S. 125 even if it is determined at S. 124 that the pulse outputs from the PZ pulser 69 have an interval less than 100 since a drive system for the zooming lens group or the like is considered to have failed.

This is made for the protection of the motor and is like the operation at S. 121.

As S. 125, a zooming operation stop subroutine is executed by the PZ motor to stop the operation of the photographic lens L and the flow goes to S. 128.

Further, when it is determined at S. 122 that the zooming lens group is not being driven for accommodation, the flow skips S. 123–S. 125 and goes to S. 128.

When the determination is YES at S. 127, the operation is normally carried out and then the flow skips S. 125 and goes to S. 128, since the zooming operation stop subroutine is not necessary to be executed by the PZ motor at S. 125.

It is determined at S. 128 whether the focusing lens group is being driven for accommodation in response to the determinations at S. 122, S. 125 and S. 127. When the determination is YES, it is determined at S. 130 whether a period of time measured by the timer which started its operation at S. 116, exceeds the maximum accommodation time stored in the lens ROM 67.

When the determination is YES, the AF operation stop subroutine is executed at S. 131 to stop the operation of the focusing lens, since it is considered that some troubles are caused to the photographic lens or that the focusing lens mounted on the camera body CB is excessively long.

In addition, at S. 132, the zooming operation stop subroutine by the PZ motor is executed for the same purpose as that of the execution at S. 131 to stop the operation of the photographic lens L.

Note that the control effected by the timer is to protect the motors and the like to insure dual safety together with S. 120, S. 121 and S. 126, S. 127.

At S. 133, the power hold of the system is released to terminate the flow.

On the other hand, when it is determined at S. 128 that the focusing lens group is not being driven for accommodation, it is determined at S. 129 whether the zooming lens group is being driven for accommodation.

When the determination is YES, the flow goes to S. 130 and is terminated through the above S. 130-S. 133, and when the determination is NO, the flow goes to the S. 133 and is terminated by turning off the power hold.

Further, when it is determined at S. 130 that the maximum accommodation time has not elapsed, it is determined at S. 134 whether the main switch is turned off.

When it is determined that the main switch is turned off, the flow returns to N and circulates through S. 116–S. 130 and S. 134 to wait until the accommodation time has elasped or the AF motor or the PZ motor stops.

When it is determined that the main switch is turned on, the accommodation of each lens group is stopped (see Steps S.135 and S.136) in this lens accommodation mode and the flow returns to the AF photographing mode S.138 through an NG processing mode S.137 since it is considered that a user has changed his mind to finish photographing during the lens accommodation process and operates the main switch.

Figure 6:
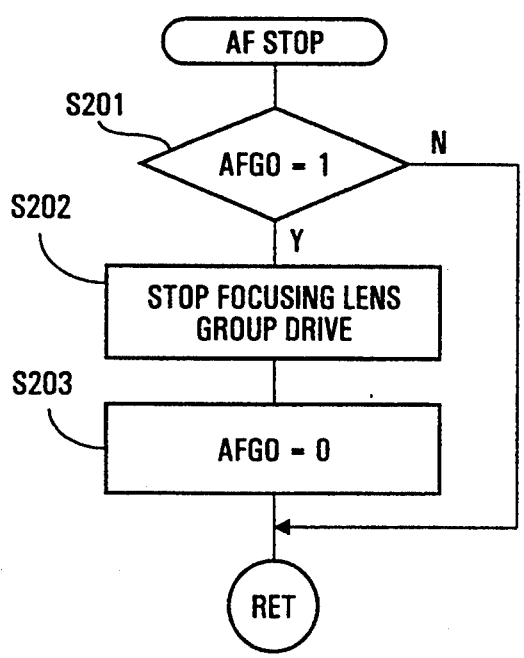
FIG. 6 is a subroutine to stop the AF drive of a focusing lens.

Next, the AF operation stop subroutine shown in FIG. 6 will be described.

In the AF operation stop subroutine, it is determined at S. 201 whether the focusing lens group is stopped. When the determination is YES, the flow skips the succeeding steps and returns because the AF operation is stopped.

When the determination is NO, the drive of the focusing lens group is stopped at S. 202 and a flag mark is set to indicate that the focusing lens group is stopped at S. 203, and then the flow returns.

Figure 7:
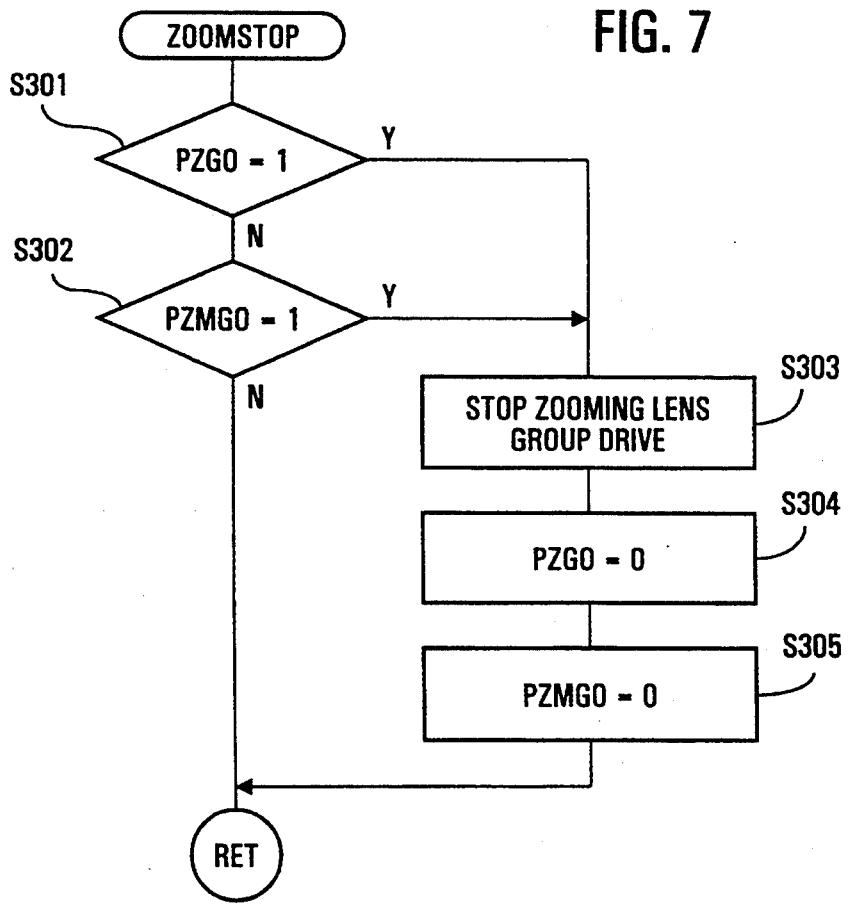
FIG. 7 is a subroutine to stop the drive of a zooming lens.

Next, the zooming operation stop subroutine shown in FIG. 7 will be described.

In the zooming operation stop subroutine, it is determined at S. 301 and S. 302 whether the zooming lens group is operated in a zooming range or in a macro range. When the zooming lens group is operated in neither of the zooming range nor in the macro range, the flow returns as it is.

When the zooming lens group is operated in at least one of the ranges, the drive of the zooming lens is stopped at S. 303, and a flag mark is set to indicate that the zooming lens group is stopped in the zooming range and the macro range at S. 304 and S. 305, and the flow then returns.

As described above, according to the above embodiment, since each photographing lens that is exchangeably mounted on the camera body is provided with inherent data indicating whether or not it can be accommodated, the camera body is not required to be provided with data indicating whether or not various kinds of photographing lenses can be accommodated.

As result, the amount of data to be stored in the camera body can be reduced, and the camera lens accommodating device can be arranged as a relatively simple processing system so that this system is preferable for cameras that are exchangeably provided with various kinds of photographing lenses.

What is claimed is:

1. A single lens reflex camera having a lens accommodation device, comprising:
a camera body;
a photographic lens assembly including a zoom lens system, that is selectively attachable to said camera body, said photographic lens assembly providing data to said camera body representing whether said photographic lens assembly can be automatically driven to change an over-all length of said assembly, by driving said zoom lens system;
power assisted means for automatically driving said zoom lens system of said photographic lens assembly;
means for said camera body to determine whether said photographic lens assembly attached to said camera body is capable of being accommodated by driving said zoom lens system based upon said data provided by said photographic lens assembly; and
means for controlling said power-assisted means so that when said camera is switched to a non-operative state, said zoom lens system of said photographic lens assembly is driven in a direction in which said photographic lens assembly is accommodated so as to reduce said over-all length of said photographic lens assembly if said determining means determines that said over-all length of said photographic lens system can be accommodated.

2. The single lens reflex camera having a lens accommodation device according to claim 1, wherein said power assisted means comprises a pulse motor; and wherein said pulse motor is operated until said pulse motor produces a predetermined number of pulses.

3. The single lens reflex camera having a lens accommodation device according to claim 1, wherein said power assisted means is operated for a predetermined period of time so as to allow said zoom lens system to move between one end point and a second end point of a moving range of said zoom lens system.

4. The single lens reflex camera having a lens accommodation device according to claim 1, wherein said photographic lens assembly comprises more than one lens group and said power assisted means comprises more than one drive means corresponding to each of said lens groups, said more than one drive means driving said more than one lens group until a time period necessary to move respective lens groups in respective moving ranges thereof has passed.

5. A single lens reflex camera body to which a photographic lens assembly including a zoom lens system and power assist means for automatically driving the zoom lens system is selectively mounted, comprising:
means for receiving data from said photographic lens assembly representing whether said photographic lens assembly can be automatically driven so as to change an over-all length of said assembly that is mounted to said camera body by driving said zoom lens system;
means for said camera body to determine whether said mounted photographic lens assembly is capable of being accommodated by driving said zoom lens system based upon said data received from said photographic lens assembly by said receiving means; and
means for controlling said power assisted means so that when said camera body is switched to a non-operative state, said zoom lens system of said photographic lens assembly is driven in a direction in which said photographic lens assembly is accommodated so as to reduce said over-all length of said photographic lens assembly if said mounted photographic lens assembly is determined by said determining means to be accommodatable.

6. A lens unit that is interchangeably mounted on a single lens reflex camera body, comprising a photographic lens assembly including a zoom lens system, power assisted means for automatically driving said zoom lens system of said photographic lens assembly and means for transmitting data to said camera body representing whether said photographic lens assembly can be automatically driven to reduce an over-all length of said assembly by driving said zoom lens system when said camera body is switched to a non-operative state.

7. The lens unit according to claim 6, wherein said photographic lens assembly comprises more than one lens group which are independently movable and said data transmitting means provides respective data for each of said lens groups.

8. An apparatus for accommodating an interchangeable photographic lens assembly that is mountable on a single lens reflex camera body, said photographic lens assembly including a zoom lens system and power assisted means for automatically driving said zoom lens system, said apparatus comprising:
- a memory associated with said photographic lens assembly that contains data inherent to said photographic lens assembly and representing whether said photographic lens assembly can be automatically driven to change an over-all length of said assembly by driving said zoom lens system;
- means for examining said memory to determine whether said photographic lens assembly can be automatically driven to change the over-all length of said assembly, by driving said zoom lens system; and
- means for controlling said power assisted means so that when said camera is switched to a non-operative state, said zoom lens system of said photographic lens assembly is driven in a direction in which said photographic lens assembly is accommodated so as to reduce said over-all length of said photographic lens assembly, if said examining means determines that the over-all length of said photographic lens assembly can be accommodated.

9. The apparatus of claim 8, wherein said memory comprises a read-only-memory that is housed inside said photographic lens assembly.

10. The apparatus of claim 8, wherein said memory examining means comprises a processor that is housed in said camera body.

11. The apparatus of claim 8, wherein said memory examining means comprises a processor that is housed inside said photographic lens assembly.

12. The apparatus of claim 8, wherein said power assisted means comprises a motor.

13. The apparatus of claim 12, wherein said motor comprises a pulse motor.

14. The apparatus of claim 13, wherein said pulse motor produces a series of pulses as long as said zoom lens system is being driven by said pulse motor.

15. The apparatus of claim 8, wherein, when said camera is switched to a non-operative state, a procedure to terminate a supply of electrical power to said camera body is executed.

16. The apparatus of claim 8, further comprising means for disabling said power assisted means after an occurrence of a predetermined event.

17. The apparatus of claim 16, wherein said predetermined event comprises a predetermined time period.

18. The apparatus of claim 17, wherein said power assisted means comprises a pulse motor that produces a series of pulses as long as said zoom lens system is being driven by said pulse motor.

19. The apparatus of claim 18, wherein said predetermined event comprises a cessation of pulses produced by said pulse motor, said cessation of pulses indicating that said zoom lens system has been driven to an end that results in a smallest possible overall length of said photographic lens assembly.

20. The apparatus of claim 18, further comprising means for counting said pulses that are generated as said zoom lens assembly is being driven by said pulse motor.

21. The apparatus of claim 20, wherein said predetermined event comprises said counting means reaching a predetermined count.

22. The apparatus of claim 21, wherein said predetermined count is determined by referring to said data inherent in said memory.

23. A single lens reflex camera to which an interchangeable photographic lens assembly including a zoom lens system can be selectively mounted, comprising:
- power assisted means for automatically driving said zoom lens system of said photographic lens assembly;
- means for determining, based upon data stored in a memory that is inherent to said photographic lens assembly whether said photographic lens assembly can be automatically driven to change the over-all length of said assembly, by driving said zoom lens system; and
- means for controlling said power assisted means so that when said camera is switched to a non-operative state, said zoom lens system of said photographic lens assembly is driven in a direction in which said photographic lens assembly is accommodated so as to reduce the over-all length of said photographic lens assembly if said determining means determines that said over-all length of said photographic lens system can be accommodated.

24. The camera of claim 23, wherein said memory is housed in said photographic lens assembly.

25. The camera of claim 23, wherein said examining means comprises a processor.

26. The camera of claim 23, further comprising means for disabling said power assisted means upon the completion of accommodating said photographic lens assembly.

27. The camera of claim 23, wherein said power assisted means comprises a motor.

28. The camera of claim 27, further comprising means for disabling said motor upon the occurrence of a predetermined event.

29. An interchangeable photographic lens assembly including a zoom lens system for use with a single lens reflex camera, comprising:
- power assisted means for automatically driving said zoom lens system of said photographic lens assembly;
- said photographic lens assembly including data representing whether said photographic lens assembly can be automatically driven to change an over-all length of said photographic lens assembly by driving said zoom lens system;
- means enabling said camera body to determine whether said photographic lens assembly attached to said camera body is capable of being accommodated by driving said zoom lens system based upon data of said photographic lens assembly; and
- means for controlling said power assisted means so that, when the camera is switched to a non-operative state, said zoom lens system of said photographic lens assembly is driven in a direction in which said photographic lens assembly is accommodated so as to reduce the over-all length of said lens assembly if said determining means determines that the over-all length of said photographic lens system can be accommodated.

30. The interchangeable photographic lens assembly of claim 29, wherein said power assisted means comprises a motor.

31. The interchangeable photographic lens assembly of claim 29, wherein said power assisted means comprises a motor that is housed in said photographic lens assembly.

32. The interchangeable photographic lens assembly of claim 29, wherein said data is contained in a read-only memory that is housed in said photographic lens assembly.

33. The interchangeable photographic lens assembly of claim 29, wherein said determining means comprises a lens cpu.

34. The interchangeable photographic lens assembly of claim 29, wherein said determining means comprises a camera body cpu.

35. A method for accommodating an interchangeable photographic lens assembly including a memory and a zoom lens system that is associated with a single lens reflex camera body, comprising the steps of:
providing a power assist for automatically driving the zoom lens system of the photographic lens assembly;
examining data stored in the memory of the photographic lens assembly representing whether the photographic lens assembly can be automatically driven to change an over-all length of said assembly by driving said zoom lens system; and
controlling the power assisted driving of the zoom lens system so that when the camera is switched to a non-operative state, the zoom lens system of the photographic lens assembly is driven in a direction in which the photographic lens assembly is accommodated so as to reduce the over-all length of the photographic lens assembly, if it is determined from the data stored in the memory that the over-all length of the photographic lens assembly can be accommodated.

36. The method of claim 35, further comprising the step of disabling the driving of the zoom lens system upon the occurrence of a predetermined event.

37. The method of claim 35, wherein the step of providing a power assist comprises using a motor to drive the zoom lens system.

38. The method of claim 37, wherein the step of using a motor to drive the zoom lens system comprises the step of using a motor that produces a series of pulses as the zoom lens system is being driven by the motor.

39. The method of claim 38, further comprising the step of disabling the driving of the zoom lens system upon the occurrence of a predetermined event.

40. The method of claim 39, wherein the step of disabling the driving of the zoom lens system upon the occurrence of a predetermined event comprises the step of terminating a supply of electrical power to the motor when the pulses are no longer produced.

41. The method of claim 39, wherein the step of disabling the driving of the zoom lens system upon the occurrence of a predetermined event comprises the step of terminating a supply of electrical power to the motor after a predetermined time period.

42. The method of claim 35, wherein the data stored in the memory is stored in a read-only-memory.

43. The method of claim 35, wherein the step of examining the memory comprises the step of analyzing the data in the memory with a processor.

44. The method of claim 35, wherein the step of controlling the power assisted driving of the zoom lens system is a direction that results in the over-all length of the photographic lens assembly being reduced, comprises the step of driving the zoom lens system prior to a termination of a supply of electrical power to the camera body.

45. The method of claim 44, wherein the step of driving the zoom lens system comprises the step of driving the zoom lens system with a motor that produces a series of pulses as the zoom lens system is being driven by the motor.

46. The method of claim 45, further comprising the step of disabling the driving of the zoom lens system upon the occurrence of a predetermined event.

47. A method for accommodating an interchangeable photographic lens assembly including a zoom lens system that is selectively mounted to a single lens reflex camera body, comprising the steps of:
providing a power assist for automatically driving the zoom lens system of the photographic lens assembly;
providing data, transferable to the camera body from the photographic lens assembly, representing whether the photographic lens assembly can be automatically driven to change an over-all length of the assembly by driving the zoom lens system; and
controlling the power assist to drive the zoom lens system of the photographic lens assembly in such a manner that when the camera is switched to a non-operative state, the zoom lens system of the photographic lens assembly is driven in a direction in which the photographic lens assembly is accommodated so as to reduce the over-all length of the photographic lens assembly if the data transferred to the camera body represents that the over-all length of the photographic lens assembly can be accommodated.

48. The method of claim 47, wherein the step of providing data comprises the step of examining data in a memory associated with the interchangeable photographic lens assembly so as to determine whether the photographic lens assembly can be accommodated.

49. The method of claim 47, further comprising the step of stopping the driving of the zoom lens system when a predetermined condition exists.

* * * * *

UNITED STATES PATENT AND TRADEMARK OFFICE
CERTIFICATE OF CORRECTION

PATENT NO. : 5,432,584
DATED : July 11, 1995
INVENTOR(S) : N. SUZUKI et al.

It is certified that error appears in the above-indentified patent and that said Letters Patent is hereby corrected as shown below:

On the Title page, in section [75], "Inventors", line 2, change "Saitama" to ---Saitama-ken---.

On the Title page, in section [30], "Foreign Application Priority Data", line 2, change "1989" to ---1988---.

Signed and Sealed this

Eighteenth Day of March, 1997

Attest:

BRUCE LEHMAN

Attesting Officer

Commissioner of Patents and Trademarks